United States Patent [19]

Hespelt et al.

[11] Patent Number: 4,847,872

[45] Date of Patent: Jul. 11, 1989

[54] METHOD AND ARRANGEMENT FOR SYNCHRONIZING A RECEIVER IN DIGITAL TRANSMISSION SYSTEMS

[75] Inventors: Volker Hespelt; Thomas Alberty, both of Backnang, Fed. Rep. of Germany

[73] Assignee: ANT Nachrichtentechnik GmbH, Backnang, Fed. Rep. of Germany

[21] Appl. No.: 141,372

[22] Filed: Jan. 7, 1988

[30] Foreign Application Priority Data

Jan. 9, 1987 [DE] Fed. Rep. of Germany ....... 3700457

[51] Int. Cl.$^4$ .............................................. H04L 7/06
[52] U.S. Cl. ...................................... 375/97; 329/105; 375/113; 455/71
[58] Field of Search ................... 455/46–70, 455/71, 89–97; 375/106–113, 83–86, 97; 329/105–110, 126

[56] References Cited

U.S. PATENT DOCUMENTS

| 3,372,335 | 3/1968 | Takada | 455/71 |
| 3,571,717 | 3/1971 | Monrolin | 455/46 |
| 3,593,256 | 7/1971 | Gannon | 455/71 |
| 4,295,222 | 10/1981 | Uffelen | 375/113 |

Primary Examiner—Benedict V. Safourek

Attorney, Agent, or Firm—Spencer & Frank

[57] ABSTRACT

A method and circuit arrangement for synchronizing a receiver in a digital transmission system with transmission of a special preamble selected in such a manner that, with correct demodulation, the received signal has a cosine shape with a pattern frequency fp from which the clock pulse frequency results, and wherein frequency and/or phase of the carrier and clock pulse signal, respectively, are estimated, and, after demodulation with an assumed carrier frequency ft0, the individual spectral lines (gp, gn) of the received signal (rd) are obtained by filtering, and from these signals, their frequency (fgp, fgn) and phase ($\Theta$ gp, $\Theta$ gn) are determined by linear regression, with these frequency and phase values being used, by means of subsequent difference and sum formation, to obtain the following estimated values:

carrier frequency offset $\hat{ft}\Delta = \frac{1}{2}(fgp + fgn)$,
pattern frequency $\hat{fp} = \frac{1}{2}(fgp - fgn)$,
clock pulse phase $\hat{\epsilon} = \frac{1}{2}(\Theta gp - \Theta gn)$, and
carrier phase $\hat{\Theta} = \frac{1}{2}(\Theta gp + \Theta gn) - \frac{ft\Delta \cdot \epsilon}{ft0 + fp\Delta}$

6 Claims, 4 Drawing Sheets

METHOD AND ARRANGEMENT FOR SYNCHRONIZING A RECEIVER IN DIGITAL TRANSMISSION SYSTEMS

BACKGROUND OF THE INVENTION

The present invention relates to a method and an arrangement for synchronizing a receiver for digital signals with transmission of a special preamble selected in such a manner that, with correct demodulation, the received signal has a cosine shape with a pattern frequency fp from which the clock pulse frequency results, and wherein the frequency and/or phase of the carrier and clock pulse signal, respectively, are estimated.

In conventional digital transmission systems, the problem of clock pulse and carrier synchronization is solved by means of feedback connected control loops. The advantage of such a solution lies in the low expenditures required.

For modern burst transmission systems, however, very short acquisition times are needed which can usually not be maintained with feedback connected control loops. Therefore fast estimation processes become very important for the initial synchronization.

In an article by Viterbi, entitled "Nonlinear Estimation of PSK Modulated Carrier Phase with Application To Burst Digital Transmission", IEEE Transactions on Information Theory, Volume IT-29, No. 4, July, 1983, a method is presented for estimating the carrier phase in an m-PSK transmission. An article entitled "Maximum Likelihood Detection and Synchronization by Parallel Digital Signal Processing" by Ascheid and Meyr, 1984, IEEE, Globecom, pages 1068 et seq. describes a method for parallel estimation of clock pulse and carrier phase in modulation methods employing constant envelope curves.

For the case of a specifically transmitted preamble, an article entitled "A Microprocessor-Based PSK Modem for Packet Transmission Over Satellite Channels" by Heegard et al, IEEE Transactions on Communications, Vol. Com-26, No. 5, May, 1978, pages 552 et seq., discloses a possibility for estimating carrier frequency, carrier phase and clock pulse phase for initial synchronization. This process results only in a relatively rough estimate of the clock pulse phase, with a limited frequency offset being neglected.

SUMMARY OF THE INVENTION

It is an object of the present invention to provide a method of the above mentioned type and a circuit arrangement which makes it possible to perform a fast, reliable estimation of the frequency and phase of the received carrier and clock pulse signals and to thus permit fast synchronization at relatively low cost.

The above and other objects are accomplished, according to the present invention, in a method for synchronizing a receiver in a digital transmission system which transmits to the receiver a signal containing a carrier signal component, a clock pulse signal component and a special preamble selected in such a manner that, the received signal has a cosine shape with a pattern frequency fp from which an associated clock pulse frequency results, which method includes estimating at least one of the frequency and phase of the carrier and clock pulse signal components, by the improvement comprising, at the receiver: obtaining representations of the individual spectral lines (gp, gn) of the received signal by filtering; determining the respective frequencies fgp and fgn associated with these spectral lines and the respective phases $\vartheta$gp and $\Theta$gn associated with these spectral lines by linear regression; and subjecting the determined frequency and phase values to subsequent difference and sum formation, to obtain the following estimated values:

carrier frequency offset $\hat{f}t\Delta = \frac{1}{2}(fgp + fgn)$,
pattern frequency $\hat{f}p = \frac{1}{2}(fgp - fgn)$,
clock pulse phase $\hat{\epsilon} = \frac{1}{2}(\Theta gp - \Theta gn)$, and
carrier phase $\hat{\Theta} = \frac{1}{2}(\Theta gp + \Theta gn) - \dfrac{\hat{f}t\Delta \cdot \hat{\epsilon}}{\hat{f}0 + \hat{f}p\Delta}$ where fp0 is a known pattern frequency value and p$\Delta$ is the difference between fp and fp0.

The objects of the invention are further achieved, in a circuit arrangement for synchronizing a receiver in a digital transmission system with transmission of a special preamble selected in such a manner that the received signal has a cosine shape with a pattern frequency fp from which an associated clock pulse frequency results, which arrangement includes means for estimating at least one of the frequency and phase of the carrier and clock pulse signal components, by the improvement comprising, at the receiver:

two conjugated, complex bandpass filters (hp, hn) which are fed by the received signal rd(i) and which furnish complex output signals gp(i) and gn(i);

a circuit connected to the filters for forming sequences of the phase values $\phi$p(i) and $\phi$n(i) from the output signals, where i is the position of each phase value in the sequence;

a respective delay member and difference forming member connected to a circuit for forming the differences between every pair of successive phase values $\phi$p(i) - $\phi$p(i-1) or $\phi$n(i) - $\phi$n(i-1);

means connected for subtracting the constant component $2\pi fp0 \cdot T$ or $-2\pi fp0 \cdot T$, respectively, from each difference, with the sampling rate being 1/T, to form difference values $\phi$pd(i), $\phi$nd(i);

means connected for reducing the difference values to a range from $-\pi$ to $+\pi$; and weighting and sum and difference forming means connected for producing signal parameter values according to the following equations:

(1) the estimated carrier phase $\hat{\Theta}$ $$\hat{\Theta} = \left\{ \phi p(i = I) + \phi n(i = I) + \sum_{i=-I+1}^{I} [\phi pd(i) + \phi nd(i)] \cdot Ui - 2\hat{f}t\Delta \cdot \hat{\epsilon}/(\hat{f}p0 + \hat{f}p\Delta) \right\} / 2$$

where $Ui = -(N - 1 + 2i)/2N$ (2) the estimated carrier frequency offset $\hat{f}t\Delta$ $$\hat{f}t\Delta = \left\{ \sum_{i=-I+1}^{I} [\phi pd(i) + \phi nd(i)] Wi \right\} / 2$$

where $Wi = 6[N^2/4 - (i - 1/2)^2]/[2\pi TN(N^2 - 1)]$ (3) the estimated pattern frequency offset $\hat{f}p\Delta$ -continued $$\hat{fp}\Delta = \left\{ \sum_{i=-I+1}^{I} [\phi pd(i) - \phi nd(i)] \cdot Wi \right\} / 2$$

(4) the estimated clock pulse phase $\hat{\epsilon}$ $$\hat{\epsilon} = \left\{ \phi p(i=I) - \phi n(i=I) + \sum_{i=-I+1}^{I} [\phi pd(i) - \phi nd(i)] \: Ui \right\} / 2$$

where
i = the running number of the N sampling moments at a spacing T,
I = (N-1)/2, and
fp0 = a known pattern frequency.

Although generally the complexity of a parallel estimation process overproportionally increases when the number of unknown parameters is increased, the present estimation process is very uncomplicated because the four-dimensional estimation problem is reduced to two two-dimensional estimation problems in that special signal processing converts the four-dimensional estimation problem to a problem of estimating frequency and phase of a single complex oscillation. For and by means of a specially transmitted preamble, the invention permits a rapid and accurate estimation of the frequency and phase of the clock pulse signal and of the carrier signal.

Advantageous embodiments will be described below.

The method according to the invention can advantageously be implemented with inexpensive circuit arrangements.

DESCRIPTION OF THE PREFERRED EMBODIMENTS

Although the procedure of "linear regression" is known, for example from an article by Tretter entitled "Estimating the Frequency of a Noisy Sinusoid by Linear Regression," IEEE Transactions on Information Theory, Volume IT=31, No. 6, November, 1985, pages 832 et seq., where it is proposed to estimate the frequency and phase of a complex oscillation by linear regression of the phase values. This requires a continuous sequence of phase values. The existing sudden changes in phase by $2\pi$ radians can be detected, for example, by difference formation of successive phase values and can thus also be corrected, see Tribolet, "A New Phase Unwrapping Algorithm", in IEEE Transactions on Acoustics, Speech and Signal Processing, Vol. ASSP-25, No. 2, Apr. 1977, pages 170 et seq.

Separation of the spectral lines and processing them further in conjunction with linear regression had not been attempted in the past. Such a procedure, however, results in a very powerful yet very inexpensive receiver structure.

The method according to the present invention requires a special preamble. This preamble must be selected in such a way that, with the correct demodulation, the received signal has a cosine shape. This is the case if only the fundamental frequency of the pattern falls into the transmission band, which is accomplished, for example, in an m-PSK modulation by alternatingly transmitting two oppositely placed transmitting symbols. The frequency of the cosine signal is a function of the transmitted sequence of symbols (pattern) and of the clock pulse frequency and is called the pattern frequency. Thus, the pattern frequency includes the information regarding the clock pulse frequency. The phase position of the cosine signal correspondingly includes the information about the clock pulse phase.

After demodulation with the assumed carrier frequency ft0, the following received signal is then obtained:

$$rd(t) = 2A \cdot \cos [2\pi(fp0 + fp\Delta) \cdot t' + \epsilon] \cdot e^{j2\pi ft\Delta \cdot t} \cdot e^{j\Theta}$$

where $t' = t + \frac{\epsilon}{2\pi(fp0 + fp\Delta)}$ t is the time;
2A is the unknown amplitude of the received signal,
fp0 is the known pattern frequency,
fp$\Delta$ is the unknown pattern frequency offset,
$\epsilon$ is the unknown clock pulse phase,
ft$\Delta$ is the unknown carrier frequency offset, and
$\Theta$ is the unknown carrier phase.

The spectrum of the received signal then results as follows:

$$Rd(f) = A \cdot e^{j f \epsilon / (fp0 + fp\Delta)} \cdot [\delta(f - fp0 - fp\Delta - ft\Delta) +$$

$$\delta(f + fp0 + fp\Delta - ft\Delta)] \cdot e^{j\Theta}$$

Figure 1:
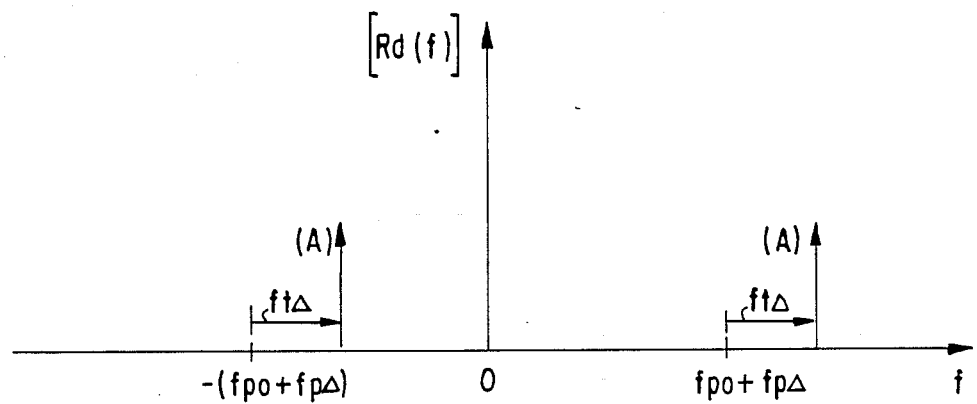
FIG. 1 is a spectral diagram illustrative of a signal derived in the practice of the present invention.

The spectrum of the received signal can be seen in FIG. 1.

Figure 2:
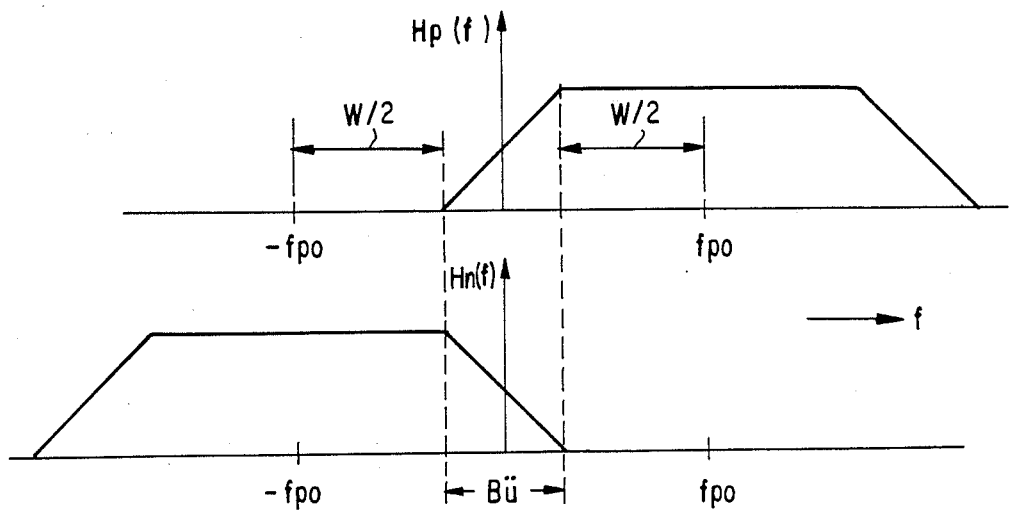
FIG. 2 is a further spectral diagram illustrating the practice of the present invention.

FIG. 2 shows the transfer functions of the two bandpass filters for the separation of the spectral lines plotted as a function of frequency.

Figure 3:
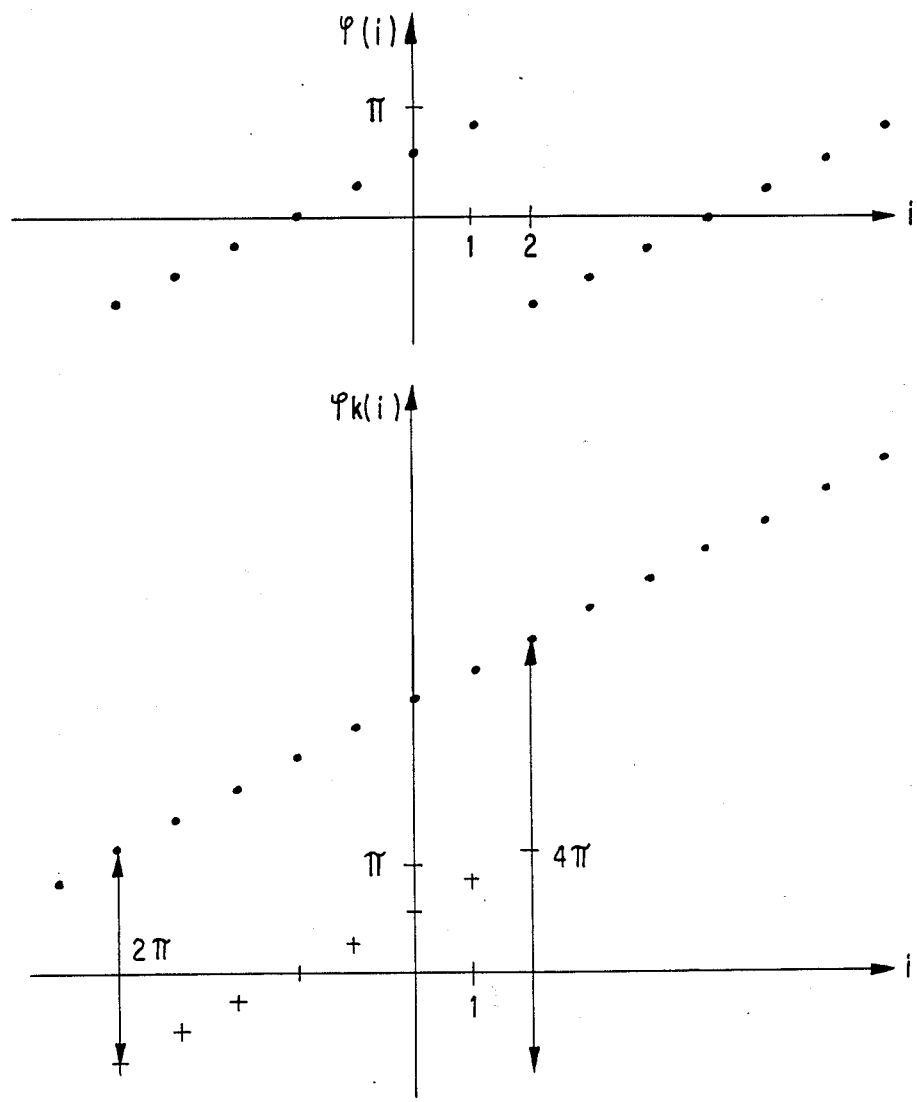
FIG. 3 is a diagram further illustrating the invention.

Finally, FIG. 3 illustrates the linear regression method employed according to the invention and will be described in detail below.

The method steps involved will be described below, together with a mathematical development of the basic idea underlying the invention. Then, the circuit arrangement of FIG. 4 will be described.

The problem of parallel estimation of the four desired signal parameters, namely the frequency and phase of the clock pulse and of the carrier oscillations, is simplified with respect to costs by special signal processing in that the received signal, after demodulation with the assumed carrier frequency ft0, is filtered through two complex bandpass filters hp and hn. The transfer functions Hp(f), Hn(f) of the two complex bandpass filters hp and hn are represented by the frequency curves shown in FIG. 2 and these bandpass filters generate, from the demodulated received signal rd(t), two complex signals gp(t) and gn(t). Such a separation is possible if the magnitude of the sum or difference between pattern frequency offset fp$\Delta$ and carrier frequency offset ft$\Delta$ is less than half the bandwidth W/2 of the transmission range of the two filters.

As can be seen in FIG. 2, the two pattern frequencies fp0 and −fp0 lie exactly in the middle of the two transmission ranges hp and hn, respectively.

The two output signals gp and gn thus result as follows:

$$gp(t) = A \cdot \exp\{j[2\pi(fp0 + fp\Delta + ft\Delta) \cdot$$
$$(t + \epsilon/(2\pi(fp0 + fp\Delta))) + \Theta]$$

and $$gn(t) = A \cdot \exp\{j[2\pi(ft\Delta - fp0 - fp\Delta) \cdot$$
$$(t + \epsilon/(2\pi(fp0 + fp\Delta))) + \Theta]$$

Because of this structure of the two obtained signals, the estimation problem has now been transferred from the original four-dimensional parameter domain to two two-dimensional parameter domains. The problem has been reduced to a determination of frequency and phase of the two complex signals gp and gn.

Frequency fgp and phase $\Theta gp$ of signal indicator gp(t) are as follows:

$$fgp = fp0 + fp\Delta + ft\Delta$$

$$\Theta gp = \frac{fp0 + fp\Delta + ft\Delta}{fp0 + fp\Delta} \cdot \epsilon + \Theta$$

Correspondingly, the following applies for signal indicator gn(t):

$$fgn = ft\Delta - fp0 - fp\Delta$$

$$\Theta gn = \frac{ft\Delta - fp0 - fp\Delta}{fp0 + fp\Delta} \cdot \epsilon + \Theta$$

From this equation system, the unknown parameters fpΔ, ϵ, ftΔ and $\Theta$ can be calculated if the frequency and phase of the two signal indicators gp(t) and gn(t) are known.

A useful method of estimating the frequency fs and phase $\Theta$s of a complex oscillation is the linear regression of the phase values. To accomplish this, the sudden changes in phase by $2\pi$ contained in the sequence of phase values must be reversed. A simple method of eliminating these sudden changes is to observe the differences between successive phase values and to make the following assumptions:

If the difference is greater than $\pi$, a sudden change of $+2\pi$ probably occurred; if, however, the difference is less than $-\pi$, the sudden change is probably $-2\pi$. Thus, initially a series of main phase values is formed as follows:

$$\phi(i) = 2\pi fsiT + \Theta s + zi \cdot 2\pi$$

where $\phi(i) = \phi(t = i \cdot T)$ and $i = \{-I, -I + 1, \ldots, I\}$, i.e. with $N = 2I + 1$ sampled values at a spacing of $T$ and with $zi \epsilon Z$ such that $|\phi(i)| \leq \pi$.

If an even number of sampling values is present, I is a fraction.

Difference formation indicates the occurrence of sudden changes and corrects them, thus producing the following continuous sequence:

$$\phi k(i) = 2\pi fsiT + \Theta s + z_{-I} \cdot 2\pi$$

By way of linear regression, it is then possible to determine frequency and phase.

FIG. 3 shows these conditions, with the upper part of the figure showing the measured main phase values including the $2\pi$ changes and the lower part of FIG. 3 showing the corrected steady curve $\phi k(i)$. It can easily be seen that with each sudden change, an increase by $2\pi$ must take place.

Moreover, the problems involved in reducing this technique to practice can be seen. Depending on frequency and period of observation NT, the range of values of $\phi k(i)$ may become rather large. It is therefore much simpler, for realization in practice, to compute only with the difference values. It is therefore assumed that $$\phi d(i) = \phi(i) - \phi(i-1) + yi \cdot$$

$2\pi$ where $i = \{-I + 1, -I + 2, \ldots, I\}$, i.e. with $N -$ 1 values and $yi \epsilon Z$ such that $|\phi d(i)| \leq \pi$.

$\phi d(i)$ is the sequence of differences in phase values $\phi(i)$, reduced to the range from $-\pi$ to $+\pi$. Then, with linear regression, one obtains the following estimates values fs and $\hat{\Theta}$ s:

$$\hat{\Theta}s = \phi(i = I) + \sum_{i=-I+1}^{I} \phi d(i) \cdot Ui$$

where $Ui = -(N - 1 + 2i)/2N$ and $$fs = \sum_{i=-I+1}^{I} \phi d(i) \cdot Wi$$

where $Wi = 6 \cdot [N^2/4 - (i - \frac{1}{2})^2]/[2\pi TN(N^2 - 1)]$

Figure 4:
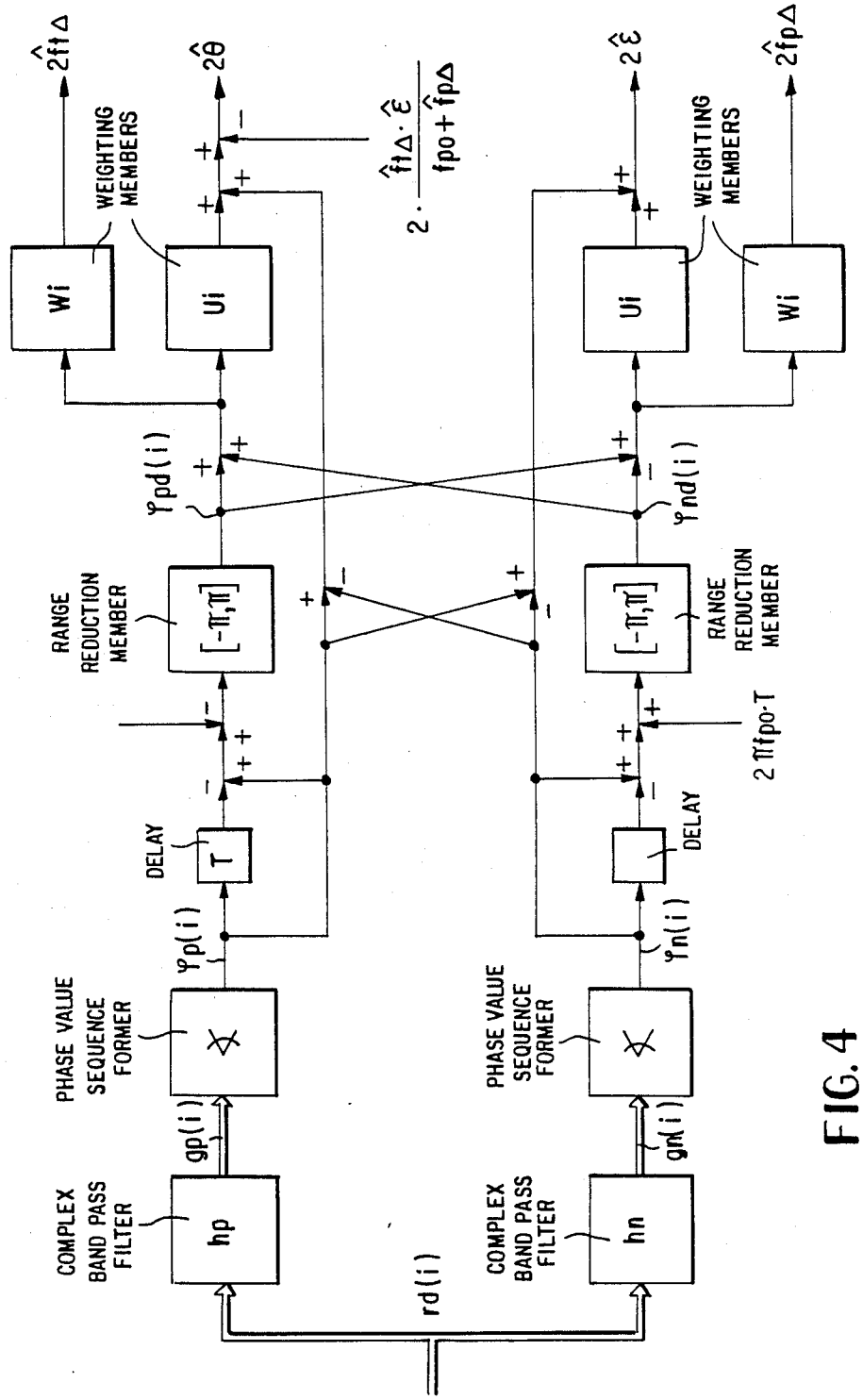
FIG. 4 is a block circuit diagram of a circuit arrangement for practicing the method according to the invention.

FIG. 4 is a block circuit diagram of an embodiment of a circuit arrangement which implements the method according to the present invention. The demodulated signal rd(i) is filtered through the two bandpass filters hp and hn. Of their transfer functions, only the transition range of a width Bü (see FIG. 2) is specified by giving fp0 and W/2. Filters which are symmetrical to the center frequency can easily be employed. For hp the center frequency is fp0 and for hn it is −fp0. Advantageously, the two bandpass filters are realized so that they are conjugated, complex filters, thus permitting easy, joint calculation which is identical for the output signals.

FIG. 4 clearly shows the two processing branches following the bandpass filters. The phase value sequences $\phi p(i)$ and $\phi n(i)$ are formed from the two output trains gp(i) and gn(i) which are complex valued. This can be done, for example, with the aid of conversion circuits containing arctan tables. Thereafter, the difference between every two successive phase values is determined. This is done in each branch by means of a delay member T and a difference forming member in which the difference $\phi(i) - \phi(i - 1)$ is formed. Before these differences values are reduced to the range from $-\pi$ to $+\pi$, the constant component of these differences, $2\pi fp0 \cdot T$ is subtracted. This results in fewer errors in the subsequent reduction. With suitable quantizing, the difference values are reduced to the range from $-\pi$ to $+\pi$ simply by cutting out the highest valued bit.

Corresponding to the linear regression process, a weighting of the signal in each branch with the factors Ui and Wi is then performed. In addition to the weighting, a few sums and differences must also be formed to obtain the desired values pΔ, tΔ, ê, θ̂. As shown in FIG. 4, these sum and difference formations may advantageously also be performed before the weighting. Then, the values pΔ, tΔ, ê, θ̂, result as shown in FIG. 4.

The method is also suitable for a determination of the frequency and phase of the clock pulse signal in base band signals. Then, demodulation with the carrier frequency ft0 and estimation of ftΔ and θ are omitted.

Figure 5:
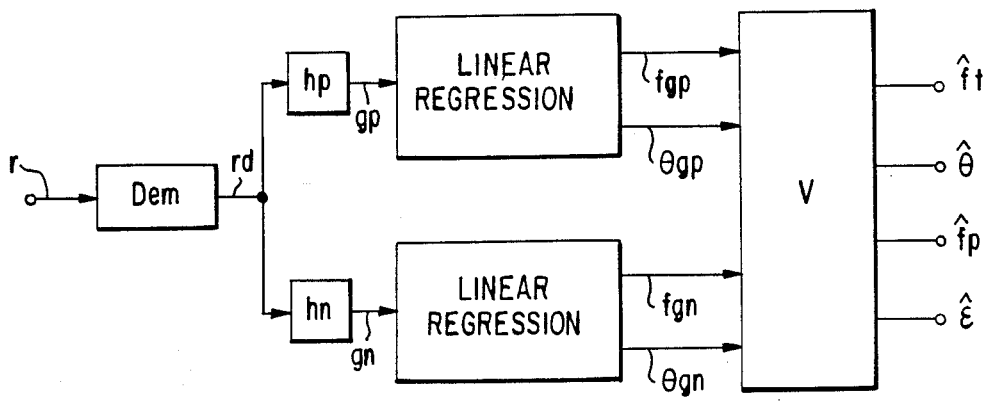
FIG. 5 is a block circuit diagram of a further embodiment of a circuit arrangement according to the invention.

FIG. 5 is a block circuit diagram for an embodiment of a circuit arrangement according to the invention, in which the spectral lines gp, gn of the received signals r and rd, respectively, are obtained after demodulation in a demodulator Dem by filtering in two complex bandpass filters hp and hn and the frequencies fgp and fgn and phases θgp and θgn of these spectral lines are determined by means of linear regression in suitable devices. By means of a linkage circuit V, the desired estimated values for the frequency t of the carrier and p of the pattern and for the phase θ̂ of the carrier and ê of the clock, pulse are determined.

The outcome of FIG. 4 is the estimate for the pattern frequency offset pΔ. The estimate for the pattern frequency p is obtained by adding the known (nominal) pattern frequency fpo, thus p=fp0+ pΔ.

Suitable embodiments of circuit blocks Ui and Wi in FIG. 4 can be FIR Filters as described for example in L.R. Rabiner, B. Gold: "Theory and Application of Digital Signal Processing", Prentice Hall, 1975, Chapter 9, with coefficient sets Ui and Wi as listed above under equations (1) and (2) respectively.

Suitable embodiments of circuit blocks hp, hn in FIGS. 4 and 5 are complex band pass filters as described for example in P. A Regalia et al, "Complex Coefficient Signal Filters," IEEE 1986 ISCAS, San Jose, Cal., pp. 1109-1112, with transfer functions as shown in FIG. 2 of the present application.

Suitable embodiments of circuit blocks T are Delay Elements as described in Chapters 8 and 9 of the above identified book by L. R. Rabiner and B. Gold.

Circuit block ∡ are elements that determine the argument of a complex input signal as described e.g., in J. E. Volder: "The Cordic Trigonometric Computing Technique", IRE Trans. Electron. Components, Vol. EC-8, 1959, pp. 330-333.

Circuit blocks [−π, π] are elements that reduce the input signal by adding ±2π until the result lies in the range −π to +π. Such a module operation is inherent in finite word length 2th complement arithmetic. The operation can be performed therefore simply by reducing the word length.

In FIG. 5 circuit block Dem is a demodulator that removes the known carried frequency fto, and can be realized as described in F.M. Gardner, "Phaselock Techniques" 2nd, Edition, John Wiley & Sons, 1979.

Suitable embodiments of circuit blocks "Linear Regression" of FIG. 5 are to be realized as described in the above identified Tretter article.

Circuit block V in FIG. 5 is an operation network which evaluates the equations according to the invention for tΔ, p, ê, and θ̂, and can be, e.g., a microcomputer.

The invention now being fully described, it will be apparent to one of ordinary skill in the art that many changes and modifications can be made thereto without departing from the spirit or scope of the invention as set forth herein.

What is claimed:

1. In a method for synchronizing a receiver in a digital transmission system which transmits to the receiver a signal containing a carrier signal component, a clock pulse signal component and a special preamble selected in such a manner that the received signal has a cosine shape with a pattern frequency fp from which an associated clock pulse frequency results, which method includes estimating at least one of the frequency and phase of the carrier and clock pulse signal components, the improvement comprising, at the receiver: demodulating the received signal with an assumed carrier frequency ft0; obtaining representations of the individual positive (gp) and negative (gn) spectral lines of the received demodulated signal by filtering; determining the respective frequencies fgp and fgn associated with these spectral lines and the respective phases gp and gn associated with these spectral lines by linear regression; and subjecting the determined frequency and phase values to subsequent difference and sum formation, to obtain the following estimated values:

carrier frequency offset $ft\Delta = \frac{1}{2}(fgp + fgn)$,
pattern frequency $fp = \frac{1}{2}(fgp - fgn)$,
clock pulse phase $\hat{\epsilon} = \frac{1}{2}(\Theta gp - \Theta gn)$, and
carrier phase $\hat{\Theta} = \frac{1}{2}(\Theta gp + \Theta gn) - \frac{ft\Delta \cdot \hat{\epsilon}}{ft0 + fp\Delta}$ where fp0 is a known pattern frequency value and pΔ is the difference between fp and fp0.

2. Method as defined in claim 1, wherein said filtering is performed by means of two conjugated, complex bandpass filters.

3. In a circuit arrangement for synchronizing a receiver in a digital transmission system with transmission of a special preamble selected in such a manner that the received signal has a cosine shape with a pattern frequency fp from which an associated clock pulse frequency results, which arrangement includes means for estimating at least one of the frequency and phase of the carrier and clock pulse signal components, the improvement comprising, at the receiver:

two conjugated, complex bandpass filters (hp, hn) which are fed by the received signal rd(i) and which furnish complex output signals gp(i) and gn(i) corresponding to the respective positive and negative spectral lines of the received signal;

a circuit connected to said filters for forming sequences of the phase values φp(i) and φn(i) from said output signals, where i is the position of each phase value in the sequence;

a respective delay member and difference forming member connected to said circuit for forming the differences between every pair of successive phase values φp(i) - φp(i-1) or φn(i) - φn(i-1);

means connected for subtracting the constant component 2πfp0·T or −2πfp0·T, respectively, from each difference, with the sampling rate being 1/T, to form difference values φpd(i), φnd(i);

means connected for reducing the difference values to a range from −π to +π; and weighting and sum and difference forming means connected for producing signal parameter values according to the following equations:

(1) the estimated carrier phase $\Theta$ $$\hat{\Theta} = \left\{ \phi p(i=I) + \phi n(i=I) + \sum_{i=-I+1}^{I} (\phi pd(i) + \phi nd(i)) \cdot Ui - 2 f t\Delta \cdot \hat{\epsilon}/(fp0 + fp\Delta) \right\} /2$$

where $Ui = -(N - 1 + 2i)/2N$ (2) the estimated carrier frequency offset $ft\Delta$ $$ft\Delta = \left\{ \sum_{i=-I+1}^{I} (\phi pd(i) + \phi nd(i)) \cdot Wi \right\} /2$$

where $Wi = 6(N^2/4 - (i - \frac{1}{2})^2)/(2\pi T N(N^2 - 1))$ (3) the estimated pattern frequency offset $fp\Delta$ $$fp\Delta = \left\{ \sum_{i=-I+1}^{I} (\phi pd(i) - \phi nd(i)) \cdot Wi \right\} /2$$

(4) the estimated clock pulse phase $\hat{\epsilon}$ $$\hat{\epsilon} = \left\{ \phi p(i=I) - \phi n(i=I) + \sum_{i=-I+1}^{I} (\phi pd(i) - \phi nd(i)) Ui \right\} /2$$

where
  i = the running number of the N sampling moments at a spacing T,
  I = (N-1)/2, and
  fp0 = a known pattern frequency.

4. Circuit arrangement as defined in claim 3 wherein the difference values $\phi pd(i)$ and $\phi nd(i)$ are represented by digital words and said means for reducing the difference values $\phi pd(i)$ and $\phi nd(i)$ operate by each time cutting out the highest value bit of the associated digital word.

5. In a method for synchronizing a receiver in a digital transmission system which transmits to the receiver a signal containing a base band signal component, a clock pulse signal component and a special preamble selected in such a manner that the received signal has a cosine shape with a pattern frequency fp from which an associated clock pulse frequency results, which method includes estimating at least one of the frequency and phase of the clock pulse signal component, the improvement comprising, at the receiver: obtaining representations of the individual positive (gp) and negative (gn) spectral lines of the received signal by filtering; determining the respective frequencies fgp and fgn associated with these spectral lines and the respective phases $\Theta$gp and $\Theta$gn associated with these spectral lines by linear regression; and subjecting the determined frequency and phase values to subsequent difference and the sum formation, to obtain the following estimated values:

pattern frequency  $fp = \frac{1}{2} (fgp - fgn)$, and
clock pulse phase  $\hat{\epsilon} = \frac{1}{2} (\Theta gp - \Theta gn)$.

6. A method as defined in claim 5, wherein said filtering is performed by means of two conjugated, complex bandpass filters.

* * * * *